# 3,250,724
POLYESTER SPACE DEODORANT AND METHOD OF USING SAME

Kurt Kulka, New York, N.Y., assignor to Fritzsche Brothers, Inc., New York, N.Y., a corporation of New York
No Drawing. Filed Oct. 31, 1962, Ser. No. 234,532
10 Claims. (Cl. 252—305)

This invention relates to deodorization of space, and more particularly to methods and compositions for deodorziation of spaces.

Various methods and substances have been utilized for the deodorization of malodors arising in kitchens, bathrooms, sickrooms, smoke-filled living rooms and spaces saturated with odors stemming from perspiration of men and household pets. Some of these methods and deodorants have depended upon the masking of the malodors by the impairment of smell. The use of formaldehyde is an example of such masking. Other methods involve superimposing the malodor with another stronger odor. Still other methods employ masking by neutralization with certain odoriferous compositions which have the property when added to a malodor of effecting a weaker odor instead of an enhanced odor as might be expected by such addition. All of these methods as well as those utilizing the adsorption of the malodors on surfaces of materials such as carbon or those entailing the oxidation of the malodor have serious drawbacks. The adsorption of malodors is not practical and is almost impossible to apply without specialized equipment in the deodorization of a room since the gaseous content of the room must be brought in contact with the solid sorption medium. To be sure, deodorization utilizing oxidation is effective; however, it is impractical and might even present problems of fire hazard and toxicity. The masking by impairing the sense of smell usually produces significant irritation of the smelling nerves. On the other hand, superimposing one odor over the malodor frequently results in a combined sickening odor which is sometimes more repellent than the malodor itself. Finally, masking by neutralization is ineffective because of the large amount of diversified malodors which are encountered in the deodorization of spaces.

In accordance with this invention, deodorization of a space is effected with a deodorant which does not impair the sense of smell and which, at the level of use, is not toxic to man and domesticated animals. The action of the deodorants of this invention does not depend upon superimposing the malodor with another, masking the malodor by neutralization or adsorption or oxidation of the malodor. Rather, the compositions employed as deodorants in the practice of this invention are capable of undergoing chemical reactions with a great number of functional groups such as those contained in some of the components of the malodor frequently encountered in spaces.

An object of this invention is to deodorize a space effectively and efficiently by chemical reactions with the malodor.

This invention involves deodorization of a space by spraying into the space a deodorant comprising a polyester of an acid dissolved in a solvent, such as an alcohol, a glycol or a hydrocarbon. The polyester has less than 27 carbon atoms and the acid has the formula:

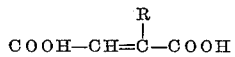

in which R is a methyl group or the —CH$_2$—COOH group. All carboxyl groups of the ester are esterified. The ester is propelled by the solvent or a propellant or both, as commonly used in the "aerosol" type of spray. Other spray type equipment may be used, such as atomizers or household sprayers. In such cases, air would be the customary propellant. The propellant which may also be the solvent for the ester is usually gaseous under normal conditions of pressure and temperature but is adapted to be non-gaseous at normal temperature by application of pressure. Examples of propellants are nitrogen, lower molecular weight hydrocarbons, such as butane and isobutane, and halogenated hydrocarbons, such as trichloromonofluoromethane and dichlorodifluoromethane.

The polyester of the acid may be a polyalkyl ester of citraconic acid, aconitic acid or mesaconic acid, such as dibutyl citraconate, dihexyl citraconate, diisobutyl citraconate, dihexyl mesaconate, diisobutyl mesaconate, tripropyl aconitate and trihexyl aconitate; a polyalkylene ester of citraconic acid and mesaconic acid, such as the digeranyl esters of citraconic acid and mesaconic acid; a polyaralkyl ester of citraconic acid or mesaconic acid, such as the dibenzyl esters of those acids; or a polyaryl ester of citraconic acid, mesaconic acid or aconitic acid. The polyesters of the acids employed as a deodorant and in the practice of this invention are prepared by conventional methods, such as the esterification of an alcohol with the acid by an exchange reaction of a lower molecular weight ester of the acid with a higher alcohol in which the formed lower alcohol is distilled off, or by the reaction of the acyl chloride of the acid with the alcohol.

The concentration of the polyester of the acid in the propellant may vary over wide limits. Usually at least 0.5 or 1% and up to 5% of the polyester of the acid is desirably employed and generally at least 75% or 80% of the propellant is preferably used. In some situations, higher concentration of the polyester may be employed. Instead of a single polyester of the acid, a plurality of polyesters of the same or different acids may be employed.

The characteristics of the polyesters of citraconic acid, mesanconic acid and aconitic acid render them especially effective deodorants in the practice of this invention. These polyesters are substantially non-irritating; they generally lend themselves well to be perfumed, giving the final product the desired odoriferous note, if required. The polyesters, moreover, are miscible with the usual propellants and solvents employed for spraying. Finally, they are stable under normal conditions of use.

While the exact mechanism of reaction of the polyesters employed as the deodorant in the practice of this invention is not conclusively proved, it is believed that, if a propellant containing a polyester of citraconic acid, mesaconic acid or aconitic acid is introduced into a space containing a malodor, such polyester which is highly activated because it is released in a finely divided state, readily undergoes chemical reaction with the components of the malodors. Since such polyesters are known to react readily with many functional groups, the malodors containing such functional groups are reacted with the polyesters to form compounds which are devoid of the malodor from which they are derived.

The deodorants comprising the solvent or propellant and the polyesters of citraconic acid, mesaconic acid or aconitic acid used in the practice of this invention may be augmented with other materials, such as mono- or polyhydric alcohols, hydrocarbons and perfumes.

The deodorants of this invention may be prepared in the same manner as other aerosol compositions are produced, such as the aerosol parasiticides described, for example, in U.S. Patent No. 2,321,023 granted to the Secretary of Agriculture, as assignee of L. D. Goodhue et al., on June 8, 1943. In the practice of the present invention, a compatible propellant should be utilized and, instead of the parasiticides of the Goodhue et al. patent, there are employed the polyesters of citraconic acid, mesaconic acid or aconitic acid with other desired augmented components.

A more comprehensive understanding of this invention is obtained by reference to the following examples:

*Example 1*

A room deodorant is prepared having the following composition:

0.5 part by weight of diisobutyl citraconate
3.0 parts by weight of propylene glycol
4.0 parts by weight of triethylene glycol
12.5 parts by weight of specially denatured anhydrous alcohol #40
80.0 parts by weight of a mixture of equal parts of trichloromonofluoromethane and dichlorodifluoromethane The composition may be placed in an aerosol dispenser or it may be employed as a household spray by substituting a solvent such as isopropyl alcohol or an alkane for the halogenated alkane propellant.

The diisobutyl citraconate is prepared by mixing 56 g. (0.5 mole) of citraconic anhydride, 111 g. (1.5 moles) of isobutanol, 1 g. of p-toluenesulfonic acid and 150 cc. of benzene. The mixture is refluxed with a water trap until the theoretical amount of water is formed. After cooling, it is washed initially with 250 cc. of water followed by 255 cc. of a 5% aqueous solution of sodium carbonate and finally with three washings of 250 cc. each of water. The washed reaction mixture is fractionated at 2 mm. to produce 96 g. of 99% pure diisobutyl citraconate having a boiling point of 109–110° C. at 2 mm. and a R.I. at 20° C. of 1.444.

*Example 2*

A room deodorant is prepared having the following composition:

0.5 part by weight of dibenzyl citraconate
3.0 parts by weight of propylene glycol
4.0 parts by weight of triethylene glycol
12.5 parts by weight of specially denatured anhydrous alcohol #40
80.0 parts by weight of a mixture of equal parts of trichloromonofluoromethane and dichlorodifluoromethane The composition may be placed in an aerosol dispenser or it may be employed as a household spray by substituting a solvent such as isopropyl alcohol or an alkane for the halogenated alkane propellent.

The dibenzyl citraconate is prepared by mixing 112 g. (1 mole) of citraconic anhydride, 270 g. (2.5 moles) of benzyl alcohol, 200 cc. of toluene and 0.5 g. of p-toluenesulfonic acid. The mixture is refluxed with a water trap until the theoretical amount of water is formed. After cooling, it is washed with 250 cc. of water, then with 250 cc. of a 5% aqueous sodium carbonate solution, followed by washing with 250 cc. portions of water until the reaction mixture is neutral to litmus paper. The solvent and excess alcohol are removed by distillation and the reaction mixture is fractionated at 0.6 mm. without a column. The dibenzyl citraconate is obtained in a 67% yield of a purity of 99%, having a boiling point of 183–187° C. at 0.6 mm. and a R.I. at 20° C. of 1.5522.

*Example 3*

A room deodorant is prepared having the following composition:

0.5 part by weight of dihexyl citraconate
3.0 parts by weight of propylene glycol
4.0 parts by weight of triethylene glycol
12.5 parts by weight of specially denatured anhydrous alcohol #40
80.0 parts by weight of a mixture of equal parts of trichloromonofluoromethane and dichlorodifluoromethane The composition may be placed in an aerosol dispenser or it may be employed as a household spray by substituting a solvent such as isopropyl alcohol or an alkane for the halogenated alkane propellant.

The dihexyl citraconate is produced by mixing 112 g. (1 mole) of citraconic anhydride, 255 g. (2.5 moles) of n-hexanol, 200 cc. of toluene and 0.5 g. of p-toluenesulfonic acid. The mixture is refluxed with a water trap until the theoretical amount of water is formed. After cooling, the reaction mixture is washed with 250 cc. of water, followed with 250 cc. of a 5% aqueous sodium carbonate solution, and finally, with two 250 cc. portions of water. The reaction mass is then neutral to litmus. The solvent and excess alcohol are removed by distillation. The product is fractionated at 0.7 mm. without a column. The dihexyl citraconate is obtained in a 79% yield of a purity of 99%, having a boiling point of 143° C. at 0.7 mm. and a R.I. at 20° C. of 1.4518.

*Example 4*

A room deodorant is prepared having the following composition:

0.5 part by weight of diisobutyl mesaconate
3.0 parts by weight of propylene glycol
4.0 parts by weight of triethylene glycol
12.5 parts by weight of specially denatured anhydrous alcohol #40
80.0 parts by weight of a mixture of equal parts of trichloromonofluoromethane and dichlorodifluoromethane The composition may be placed in an aerosol dispenser or it may be employed as a household spray by substituting a solvent such as isopropyl alcohol or an alkane for the halogenated alkane propellant.

The diisobutyl mesaconate is prepared by mixing 43 g. (⅓ mole) of mesaconic acid, 74 g. (1 mole) of isobutyl alcohol, 100 cc. of benzene and 1 g. of p-toluenesulfonic acid. The mixture is refluxed with a water trap until the theoretical amount of water is formed. After cooling, the reaction product is initially washed with 250 cc. of water, followed with a washing with 250 cc. of a 5% aqueous sodium carbonate solution and finally, with a washing of 250 cc. of water. The solvent is removed by distillation on a steam bath and the reaction mixture is then fractionated at 2 mm. without a column. The diisobutyl mesaconate is obtained in the yield of 60.3 grams of a purity of 99%, having a boiling point of 112–113° C. at 2 mm. and a R.I. at 20° C. of 1.4482.

*Example 5*

A room deodorant is prepared having the following composition:

0.50.5 part by weight of dihexyl mesaconate
3.0 parts by weight of propylene glycol
4.0 parts by weight of triethylene glycol
12.5 parts by weight of specially denatured anhydrous alcohol #40
80.0 parts by weight of a mixture of equal parts of trichloromonofluoromethane and dichlorodifluoromethane The composition may be placed in an aerosol dispenser or it may be employed as a household spray by substituting a solvent such as isopropyl alcohol or an alkane for the halogenated alkane propellant.

The dihexyl mesaconate is obtained by mixing 43 g. (⅓ mole) of mesoconic acid, 102 g. (1 mole) of n-hexanol, 100 cc. of benzene and 1 g. of p-toluenesulfonic acid. The mixture is refluxed with a water trap until the theoretical amount of water is obtained. After cooling, it is washed with 250 cc. of water followed by washing successively with 250 cc. of 5% aqueous sodium carbonate solution and with 250 cc. of water. The solvent is removed by distillation on a steam bath and the reaction mixture is fractionated at 0.6 mm. without a column.

The amount of dihexyl mesaconate obtained is 72.5 g. of a purity of 98%. It has a boiling point of 151° C. at 0.6 mm. and a R.I. at 20° C. of 1.4555.

*Example 6*

A room deodorant is prepared having the following composition:

0.5 part by weight of tripropyl aconitate
3.0 parts by weight of propylene glycol
4.0 parts by weight of triethylene glycol
12.5 parts by weight of specially denatured anhydrous alcohol #40
80.0 parts by weight of a mixture of equal parts of trichloromonofluoromethane and dichlorodifluoromethane The composition may be placed in an aerosol dispenser or it may be employed as a household spray by substituting a solvent such as isopropyl alcohol or an alkane for the halogenated alkane propellant.

The tripropyl aconitate is produced by mixing 87 g. (½ mole) of aconitic acid, 120 g. (2 moles) of n-propyl alcohol, 1 g. of p-toluenesulfonic acid and 150 cc. of benzene. The mixture is refluxed with a water trap until the theoretical amount of water is formed. After cooling, the reaction mixture is washed with 250 cc. of water. The water wash is then extracted with 100 cc. of benzene. The benzene extract is combined with the main organic parts, then washed with 250 cc. of water followed by another washing with 250 cc. of 5% aqueous sodium bicarbonate solution and finally washed with portions of 250 cc. of water until neutral to litmus. The solvent is removed by distillation and the reaction mixture is fractionated at 1.5 mm. with no column. 80 g. of tripropyl aconitate of 96% purity are obtained, having a boiling point of 151–153° C. at 1.5 mm. and a R.I. at 20° C. of 1.4536.

*Example 7*

A room deodorant is prepared having the following composition:

0.5 part by weight of triisobutyl aconitate
3.0 parts by weight of propylene glycol
4.0 parts by weight of triethylene glycol
12.5 parts by weight of specially denatured anhydrous alcohol #40
80.0 parts by weight of a mixture of equal parts of trichloromonofluoromethane and dichlorodifluoromethane The composition may be placed in an aerosol dispenser or it may be employed as a household spray by substituting a solvent such as isopropyl alcohol or an alkane for the halogenated alkane propellant.

The triisobutyl aconitate is obtained by initially mixing 87 g. (0.5 mole) of aconitic acid, 148 g. (2 moles) of isobutyl alcohol, 1 g. of p-toulenesulfonic acid and 150 cc. of benzene. The mixture is refluxed with a water trap until the theoretical amount of water is formed. After cooling, the reaction mixture is washed with 250 cc. of water. The water wash is then extracted with 50 cc. of benzene. The benzene extract is combined with the main organic portion and the combined benzene and main organic portion are washed with 250 cc. of water, followed by 250 cc. of an aqueous 5% sodium bicarbonate solution, and finally with portions of 250 cc. of water until neutral to litmus. The solvent is removed by distillation and the reaction mixture is fractionated at 0.6 mm. without a column. 138 grams of triisobutyl aconitate of 96% purity are obtained, having a boiling point of 162–164° C. at 0.6 mm. and a R.I. at 20° C. of 1.4509.

*Example 8*

A room deodorant is prepared having the following composition:

0.5 part by weight of trihexyl aconitate
3.0 parts by weight of propylene glycol
4.0 parts by weight of triethylene glycol
12.5 parts by weight of specially denatured anhydrous alcohol #40
80.0 parts by weight of a mixture of equal parts of trichloromonofluoromethane and dichlorodifluoromethane The composition may be placed in an aerosol dispenser or it may be employed as a household spray by substituting a solvent such as isopropyl alcohol or an alkane for the halogenated alkane propellant.

The trihexyl aconitate is obtained by mixing 87 g. (0.5 mole) of aconitic acid, 204 g. (2 moles) of n-hexanol and 1 g. of p-toluenesulfonic acid. The mixture is refluxed with a water trap until the theoretical amount of water is formed. After cooling, 100 cc. of benzene are added to the reaction mixture. The resulting solution is washed with 500 cc. of water, followed by 200 cc. of an aqueous 5% sodium bicarbonate solution, and finally with 200 cc. portions of water until neutral to litmus. The solvent and excess alcohol are distilled off. The reaction mixture is then fractionated at 1 mm. without a column. 142.5 g. of trihexyl aconitate having a purity of 96% are obtained, having a boiling point of 212–214° C. at 1 mm. and a R.I. at 20° C. of 1.4573.

The efficiency of the room deodorants of Examples 2, 3, 6 and 7 was tested in deodorization experiments. Two compositions of malodors were prepared in accordance with the formula developed by the General Services Administration of the United States Government. One of these malodors was a so-called tobacco smoke odor, while the other comprised the kitchen odor. In the testing, two separate, trained odor jury panels of three males and two females, and two males and three females first determined that the odor test rooms employed were clean and odorless. Into one of the test rooms there was introduced a three second aerosol spray of the malodor under test; e.g. the kitchen odor, while a three second aerosol spray of the other malodor under test was introduced into another room. This procedure was followed in two other rooms which were used as controls. The deodorant containing the polyester was introduced in the form of a three second aerosol spray into the room containing each of the malodors. Using the trained odor jury panel of three males and two females, and that of three females and two males, the room sprayed with the deodorant was compared with the room containing the malodor without any introduction of the deodorant, one minute after application of the deodorant aerosol and five minutes after the application of the deodorant aerosol. It was found that in the room in which each of the deodorants tested was introduced, there was retained a faint but characteristic odor of the deodorant. There was a marked reduction of the malodor level in each of the rooms in which the deodorant was introduced. The malodors in the control rooms in which no deodorant was introduced persisted most markedly in the same periods that the deodorized rooms showed such striking improvement.

What is claimed is:

1. The method of deodorizing a space which comprises spraying into said space a deodorant comprising a polyester of an acid propelled by a propellant which is gaseous under normal conditions of pressure and temperature but is adapted to be non-gaseous at normal temperatures by application of pressure, said polyester having less than 27 carbon atoms and said acid having the formula:

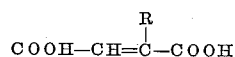

in which R is selected from the class consisting of a methyl group and the —CH$_2$—COOH group.

2. The method of deodorizing a space which comprises introducing into said space finely divided particles of a solution under pressure of a polyester of an acid, said polyester having less than 27 carbon atoms and said acid having the formula:

$$COOH-CH=\underset{R}{C}-COOH$$

in which R is selected from the class consisting of a methyl group and the —$CH_2$—COOH group.

3. The method of deodorizing a space in accordance with claim 1, in which the polyester is a polyalkylene ester.
4. The method of deodorizing a space in accordance with claim 1, in which the polyester is a polyalkyl ester.
5. The method of deodorizing a space in accordance with claim 1, in which the polyester is a polyaralkyl hydrocarbon ester.
6. The method of deodorizing a space in accordance with claim 1, in which the polyester is a polyester of citraconic acid.
7. The method of deodorizing a space in accordance with claim 1, in which the polyester is a polyester of mesaconic acid.
8. The method of deodorizing a space in accordance with claim 1, in which the polyester is a polyester of aconitic acid.
9. A deodorant comprising a polyester of an acid and a propellant gaseous under normal conditions of temperature and pressure but capable of being maintained in a non-gaseous state at normal temperatures by the application of pressure, said polyester having less than 27 carbon atoms and said acid having the formula:

$$COOH-CH=\underset{R}{C}-COOH$$

in which R is selected from the class consisting of a methyl group and the —$CH_2$—COOH group.

10. A deodorant comprising a polyester of an acid dissolved in a solvent and a propellant gaseous under normal conditions of temperature and pressure but adapted to be maintained in a non-gaseous state at normal temperatures by the application of pressure, said polyester having less than 27 carbon atoms and said acid having the formula:

$$COOH-CH=\underset{R}{C}-COOH$$

in which R is selected from the class consisting of a methyl group and the —$CH_2$—COOH group.

References Cited by the Examiner
UNITED STATES PATENTS

| | | | |
|---|---|---|---|
| 2,524,590 | 10/1950 | Boe | 252—305 |
| 3,077,457 | 2/1963 | Kulka | 252—305 |

ALBERT T. MEYERS, *Primary Examiner.*

JULIUS GREENWALD, *Examiner.*

R. D. LOVERING, *Assistant Examiner.*